US008561088B2

(12) United States Patent
Kim et al.

(10) Patent No.: US 8,561,088 B2
(45) Date of Patent: Oct. 15, 2013

(54) REGISTERING NETWORK APPLICATIONS WITH AN API FRAMEWORK

(75) Inventors: Jacob Kim, Issaquah, WA (US); John Bruno, Snoqualmie, WA (US); Thomas Jeyaseelan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 12/099,153

(22) Filed: Apr. 8, 2008

(65) Prior Publication Data

US 2009/0254926 A1    Oct. 8, 2009

(51) Int. Cl.
*G06F 9/44*    (2006.01)

(52) U.S. Cl.
USPC ........... 719/328; 719/331; 719/332; 717/162; 717/163; 717/164; 717/165; 717/167

(58) Field of Classification Search
None
See application file for complete search history.

(56) References Cited

U.S. PATENT DOCUMENTS

| | | | |
|---|---|---|---|
| 5,950,000 A | 9/1999 | O'leary et al. | |
| 6,731,625 B1 | 5/2004 | Eastep et al. | |
| 6,928,488 B1 | 8/2005 | De Jong et al. | |
| 6,944,868 B2 | 9/2005 | Simpson et al. | |
| 7,013,289 B2 | 3/2006 | Horn et al. | |
| 7,072,934 B2 | 7/2006 | Helgeson et al. | |
| 7,088,995 B2 | 8/2006 | Rao | |
| 7,124,413 B1 | 10/2006 | Klemm et al. | |
| 7,433,835 B2 | 10/2008 | Frederick et al. | |
| 7,502,760 B1 | 3/2009 | Gupta | |
| 7,533,156 B1 | 5/2009 | Jeyaraman et al. | |
| 7,574,710 B1 | 8/2009 | Jeyaraman et al. | |
| 7,577,834 B1 | 8/2009 | Traversat et al. | |
| 2002/0013777 A1 | 1/2002 | Diener | |
| 2002/0046301 A1* | 4/2002 | Shannon et al. | 709/328 |
| 2002/0062346 A1* | 5/2002 | Chen | 709/204 |
| 2002/0129024 A1* | 9/2002 | Lee | 707/10 |
| 2004/0049737 A1 | 3/2004 | Simon Hunt et al. | |
| 2004/0133848 A1 | 7/2004 | Hunt et al. | |
| 2004/0172618 A1 | 9/2004 | Marvin | |
| 2005/0004968 A1* | 1/2005 | Mononen et al. | 709/200 |
| 2005/0015619 A1* | 1/2005 | Lee | 713/201 |
| 2005/0046887 A1 | 3/2005 | Shibata et al. | |
| 2005/0138118 A1 | 6/2005 | Banatwala et al. | |
| 2005/0172282 A1 | 8/2005 | Shenfield et al. | |
| 2005/0172295 A1 | 8/2005 | Goring et al. | |
| 2005/0182843 A1* | 8/2005 | Reistad et al. | 709/230 |
| 2005/0204367 A1 | 9/2005 | Minium, Jr. et al. | |
| 2005/0273518 A1* | 12/2005 | Patrick et al. | 709/238 |

(Continued)

OTHER PUBLICATIONS

"Service Provisioning Component Overview", Microsoft White Paper, Microsoft Solution for Windows-based Hosting version 4.0, Published: Jul. 2006, 14 Pages.

(Continued)

*Primary Examiner* — Lechi Truong
*Assistant Examiner* — Shih-Wei Kraft
(74) *Attorney, Agent, or Firm* — Microsoft Corporation

(57) ABSTRACT

A method for registering a network application with an application programming interface (API) framework. In operation, a registrar may send a registration message that associates a namespace with the network application to the API framework. In one implementation, the namespace associated with the network application may be a uniform resource identifier. In another implementation, the registration message may specify a format of the standardized clients, a security policy, and the application resources associated with the network application.

20 Claims, 3 Drawing Sheets

(56) References Cited

U.S. PATENT DOCUMENTS

| | | | |
|---|---|---|---|
| 2006/0041661 A1* | 2/2006 | Erikson et al. | 709/225 |
| 2006/0069920 A1* | 3/2006 | Jolley | 713/182 |
| 2006/0085512 A1 | 4/2006 | Handel | |
| 2006/0095274 A1 | 5/2006 | Phillips et al. | |
| 2006/0106675 A1 | 5/2006 | Cohen et al. | |
| 2006/0106774 A1 | 5/2006 | Cohen et al. | |
| 2006/0122971 A1* | 6/2006 | Berg et al. | 707/3 |
| 2006/0136309 A1 | 6/2006 | Horn et al. | |
| 2006/0195476 A1* | 8/2006 | Nori et al. | 707/104.1 |
| 2006/0242574 A1* | 10/2006 | Richardson et al. | 715/530 |
| 2006/0248508 A1 | 11/2006 | Jeghers | |
| 2006/0253456 A1* | 11/2006 | Pacholec et al. | 707/10 |
| 2007/0005414 A1 | 1/2007 | Connors et al. | |
| 2007/0005713 A1 | 1/2007 | Levasseur et al. | |
| 2007/0005714 A1 | 1/2007 | Levasseur et al. | |
| 2007/0005715 A1 | 1/2007 | Levasseur et al. | |
| 2007/0005716 A1 | 1/2007 | Levasseur et al. | |
| 2007/0005717 A1 | 1/2007 | Levasseur et al. | |
| 2007/0050394 A1* | 3/2007 | Sterling et al. | 707/102 |
| 2007/0113101 A1 | 5/2007 | Levasseur et al. | |
| 2007/0159663 A1* | 7/2007 | Tsujimoto | 358/448 |
| 2007/0201654 A1 | 8/2007 | Shenfield | |
| 2007/0223462 A1 | 9/2007 | Hite et al. | |
| 2007/0234291 A1 | 10/2007 | Ronen et al. | |
| 2007/0244980 A1 | 10/2007 | Baker, III et al. | |
| 2008/0059348 A1* | 3/2008 | Glassman et al. | 705/35 |
| 2008/0103923 A1 | 5/2008 | Rieck et al. | |
| 2008/0177872 A1 | 7/2008 | Vengroff | |
| 2008/0189775 A1* | 8/2008 | Fujita | 726/7 |
| 2009/0055432 A1* | 2/2009 | Smith et al. | 707/103 R |
| 2009/0193096 A1* | 7/2009 | Boyer et al. | 709/217 |
| 2011/0119063 A1 | 5/2011 | Arnison | |

OTHER PUBLICATIONS

"Building Platforms vs Building Applications—(Part 1 of 3)", Bhavin's Blog, Dated: Nov. 16, 2007 http://bhavin.directi.com/tag/web-20/.

Bakker, et al., "Rapid Development and Delivery of Converged Services Using APIs", Lucent Technologies, Bell Labs Technical Journal, vol. 5, No. 3, Jul.-Sep. 2000, pp. 12-29.

Alonistioti, et al., "A framework for reconfigurable provisioning of services in mobile networks", International Symposium on Communications Theory & Applications (ISCTA), Ambleside Cumbria UK (2001), pp. 1-6.

"SPSS Programmability Extension" Retrieved on Mar. 10, 2008 http://www.hearne.co.nz/attachments/SPSS15%20programmability%20extension%20brochure.pdf.

"Integrating Third-Party Tracking using ActionScript" Published Mar. 10, 2008 http://studio.brightcove.com/library/howto/as-tracking/.

"The AccuBridge SDK" Retrieved on Mar. 10, 2008 http://www.accurev.com/accubridge.html.

"Third Party Software Integration and Customization" Retrieved on Mar. 10, 2008 http://www.pegasusinfocorp.com/services/third_party_software_integration_customization.htm.

Non-Final Office Action Cited in Related U.S. Appl. No. 12/099,154 Dated Dec. 14, 2009.

Final Office Action Cited in Related U.S. Appl. No. 12/099,154 Dated May 28, 2010.

Non-Final Office Action Cited in Related U.S. Appl. No. 12/099,154 Dated Aug. 20, 2010.

Final Office Action Cited in Related U.S. Appl. No. 12/099,154 Dated Feb. 15, 2011.

"Architectural Styles and the Design of Network-based Software Architectures" PhD dissertation by Roy T. Fielding, published in 2000.

Response to Non-Final Office Action cited in related U.S. Appl. No. 12/099,154 dated Mar. 15, 2010.

Response to Final Office Action cited in related U.S. Appl. No. 12/099,154 dated Jul. 28, 2010.

Response to Non-Final Office Action cited in related U.S. Appl. No. 12/099,154 dated Nov. 22, 2010.

Response to Final Office Action cited in related U.S. Appl. No. 12/099,154 dated May 16, 2011.

Non-Final Office Action cited in U.S. Appl. No. 12/099,154 dated Aug. 15, 2012, 27 pgs.

Reply Non-Final Office Action cited in U.S. Appl. No. 12/099,154 dated Nov. 16, 2012, 13 pgs.

Final Office Action in U.S. Appl. No. 12/099,154 dated Jul. 10, 2013, 26 pgs.

* cited by examiner

REGISTERING NETWORK APPLICATIONS WITH AN API FRAMEWORK

BACKGROUND

A network application, such as a Web application, is typically accessible to users via a client application. The client may be implemented as part of, or alongside, the Web application. Alternately, the developer of the Web application can publish, or make available, an application programming interface (API) so that other developers can create clients for the Web application. Some clients are standardized to particular formats, such as Really Simple Syndication (RSS) or ATOM Syndication (ATOM).

There are two components of an API: an abstraction component and an implementation component. The abstraction component is essentially a document (or series of documents) that describes to a developer how to write source code to interface with the Web application. The implementation component is executable code that acts as the interface between clients written to the API and the Web application itself.

SUMMARY

Described herein are implementations of various technologies for registering a network application with an application programming interface (API) framework. In operation, a registrar may send a registration message that associates a namespace with the network application to the API framework. In one implementation, the namespace associated with the network application may be a uniform resource identifier. In another implementation, the registration message may specify a format of the standardized clients, a security policy, and the application resources associated with the network application.

The registrar may then store create, read, update, and delete (CRUD) methods for an application resource associated with the network application. The CRUD methods may be configured to be invoked by a request from the API framework. In one implementation, the request from the API framework may be a representational state transfer (REST) or SOAP request.

In response to receiving the registration message, the API framework may create an API associated with the network application. In one implementation, the network application may be a Web application.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations of various technologies described herein are directed to registering network applications with an application programming interface (API) framework. A registrar may initiate the registration process by sending a message that associates a namespace with the network application to the API framework. The registrar may store create, read, update, and delete (CRUD) methods for an application resource associated with the network application. In response, the API framework may create an API associated with the network application. As a result, developers may then write standardized clients for the network application by simply using the API created by the API framework.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
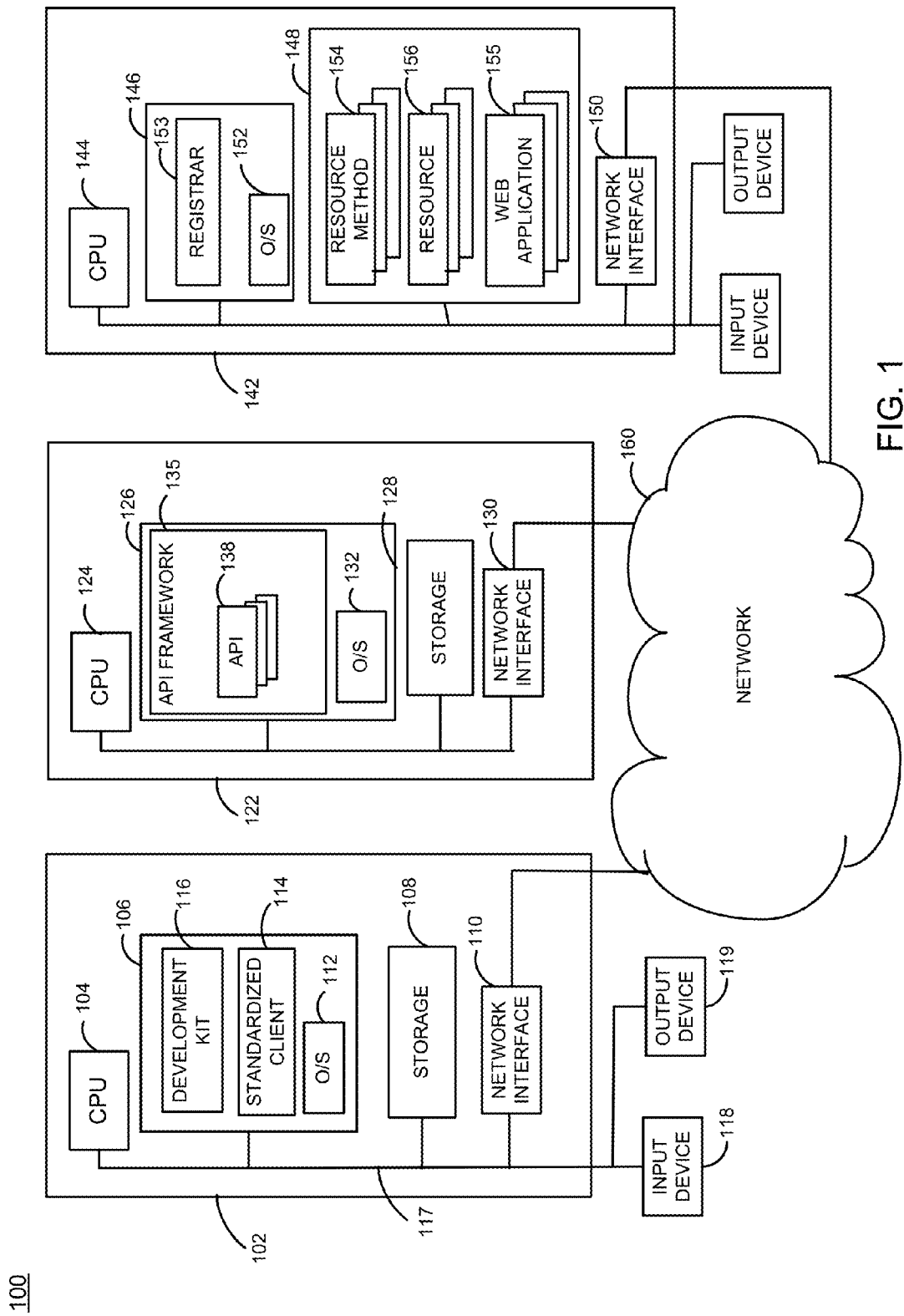
FIG. 1 illustrates a schematic diagram of a computing system in which the various technologies described herein may be incorporated and practiced.

FIG. 1 illustrates a schematic diagram of a computing system 100 in which the various technologies described herein may be incorporated and practiced. The computing system 100 includes a client 102, an application programming interface (API) framework server 122, and an application server 142 remotely connected via a network 160. The network 160 may be any network or collection of networks that link remote computers such as a local area network or a wide area network. In one implementation, the network 160 is the Internet. Although the client 102, API framework server 122, and application server 142 may be conventional desktops or server computers, as described above, other computer system configurations may be used.

The client computer 102 may include a central processing unit (CPU) 104, a system memory 106 and a system bus 117 that couples various system components including the system memory 106 to the CPU 104. It should be noted that the CPU 104 may include Virtualized systems (Virtual Machines, Processors), as well as CPU Cores and Hyper-threaded processors within a physical CPU. Although only one CPU is illustrated in FIG. 1, it should be understood that in some implementations the client computer 102 may include more than one CPU. The system bus 117 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The client computer 102 may further include a storage 108, which may be connected to the bus 117. Examples of storage 108 include a hard disk drive for reading from and writing to a hard disk, a magnetic disk drive for reading from and writing to a removable magnetic disk, and an optical disk drive for reading from and writing to a removable optical disk, such as a CD ROM or other optical media. The storage 108 and associated computer-readable media may provide nonvolatile storage of computer-readable instructions, data structures, program modules and other data for the client computer 102.

It should be appreciated by those skilled in the art that the client computer 102 may also include other types of storage 108 and associated computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the client computer 102. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored in memory 106, including an operating system 112, a standardized client 114, and a development kit 116. The operating system 112 may be any suitable operating system that may control the operation of a networked personal or server computer, such as Windows® Vista, Mac OS® X, Unix-variants (e.g., Linux® and BSD®), and the like. The standardized client 114 may be software that presents information about a Web application 155 and resources 156 (both stored on application server 142) to a user, where the client 114 is standardized to a particular format. Examples of standardized formats include really simple syndication (RSS), ATOM Syndication, ATOM Publishing Protocol (APP), JavaScript Object Notation (JSON), extensible markup language (XML), and binary XML. In one implementation, the standardized client 114 is an RSS reader.

Typically, a software engineer downloads a copy of the development kit 116 from the API framework server 122 to the client 102. The development kit 116 may include a set of development tools that enables the software engineer to create the standardized client 114. The development tools may include code editors, debugging aids, and other utilities often presented in an integrated development environment. Using the development kit 116, the software engineer may create source code (not shown), compile the source code, and link the compiled code to generate the standardized client 114.

In one implementation, the development kit 116 may communicate with an API framework 135 (stored on the API framework server 122) to determine some of the parameters required to access the Web application 155 and associated resources 156. The development kit 116 may present the parameters to the software engineer. Accordingly, the software engineer may incorporate the requisite parameters into the source code for the standardized client 114.

A user may enter commands and information into the client computer 102 through an input device 118. Examples of input devices 118 include keyboards, pointing devices, microphones, joysticks, game pads, satellite dishes, scanners, or the like. These and other input devices may be connected to the CPU 104 through the system bus 117. A user may receive information from the client computer 102 via an output device 119. Examples of output devices 119 include displays, speakers, printers, and fax machines.

The client computer 102 may be connected to the network 160 through a network interface 110. It will be appreciated that the network connections shown are exemplary and other means of establishing a communications link between the computers may be used.

The API framework server 122 and application server 142 may be similarly constructed as the client computer 102. The API framework server 122 may contain a CPU 124, system memory 126, storage 128, and network interface 130. Similarly, the application server 142 may contain a CPU 144, system memory 146, storage 148, and network interface 150.

At the application server 142, the system memory 146 may include an operating system 152 and a registrar 153. The registrar 153 may be software that makes the Web application 155 accessible to the standardized client 114 via the API framework 135. In one implementation, the registrar 153 may send a registration message to the API framework 135. In response, the API framework 135 may create an API 138 for the Web application 155. Additionally, the registrar 153 may store resource methods 154 on the application server 142. The resource methods 154, when invoked, may access/update the resources 156 associated with the Web application 155. The registrar 153 will be described in greater detail in the description of FIG. 3.

The storage 148 may include the Web application 155, resource methods 154 and resources 156. The Web application 155 may be software for sharing and managing resources 156 for users of clients 102. Examples of Web applications 155 include Weblogs (blogs), discussion boards, e-mail programs, and software for sharing media, such as photographs. In one implementation, the Web application 155 may be a Web service.

It should be noted that the Web application 155 is merely a specific example of a network application, and that any application accessible via a hypertext transfer protocol (HTTP) or HTTP over Secure Socket Layer (HTTPS) may be used in various implementations described herein.

Each resource 156 may be associated with and managed by a particular Web application 155. The resources 156 managed in the example Web applications include blog or discussion board posts, e-mails, e-mail folders, and the photographs or other media shared. Those skilled in the art recognize that a wide array of Web applications 155 and resources 156 are possible, and these examples are provided for purposes of illustration and are not intended to be limiting.

Each resource method 154 may perform one create, read, update, or delete (CRUD) operation for one or more of the resources 156 of an associated Web application 155. Resource methods 154 on the application server 142 may be invoked by the API framework 135 based on the registered API 138 for the associated Web application 155. The API framework 135 and API 138 will be described in more detail in the paragraphs below with reference to the API framework server 122.

In one implementation, the API framework 135 may invoke the resource methods 154 using a representational state transfer (REST) request to the Web application 155. REST is an architectural methodology for distributed hypermedia systems such as the World Wide Web. REST describes any simple interface that transmits domain-specific data over hypertext transfer protocol (HTTP) without an additional messaging layer.

Typically, a REST request uses the standard GET, POST, PUT, DELETE semantics of HTTP. It should be noted that other REST operations, such as HEAD (an optimized GET operation), and yet to be developed operations may be accommodated in various implementations described herein. Further, REST is merely one example of a methodology for sending application resource requests from the API framework server 122 to the application server 142. It should be noted that other methodologies/protocols, such as SOAP or binary may be used for requests to invoke resource methods 154 in various implementations described herein.

Referring now to the API framework server 122, the system memory 126 may include an operating system 132 and the API framework 135. The API framework 135 may include one or more APIs 138. The APIs 138 may specify Web applications 155 available to standardized clients via the API framework 135. Further, each API 138 may specify how the standardized client 114 may interact with the Web application 155 and associated resources 156.

The API framework 135 may be software that provides access to the Web application 155 for the standardized client 114. In one implementation, the API framework 135 may initiate requests for access to the Web application 155 and/or resources 156 in response to hypertext transfer protocol (HTTP) requests from the standardized client 114. Additionally, the API framework 135 may create the API 138 for the Web application 155 in response to a registration request from the registrar 153.

In another implementation, the API framework 135 may invoke resource methods 154 corresponding to the request from the standardized client 114 and receive a response from the Web application 155. Further, the API framework 135 may translate the response from the Web application 155 into the format used by the standardized client 114 and send the translated response to the standardized client 114.

While the computing system 100 illustrates the API framework server 122 and application server 142 as separate computers, it should be understood that in some implementations, the functionalities performed by the API framework server 122 and the application server 142 may be performed by a single computer. For example, the Web application 155, resource methods 154, and resources 156 may be alternatively stored in the storage 128.

Figure 2:
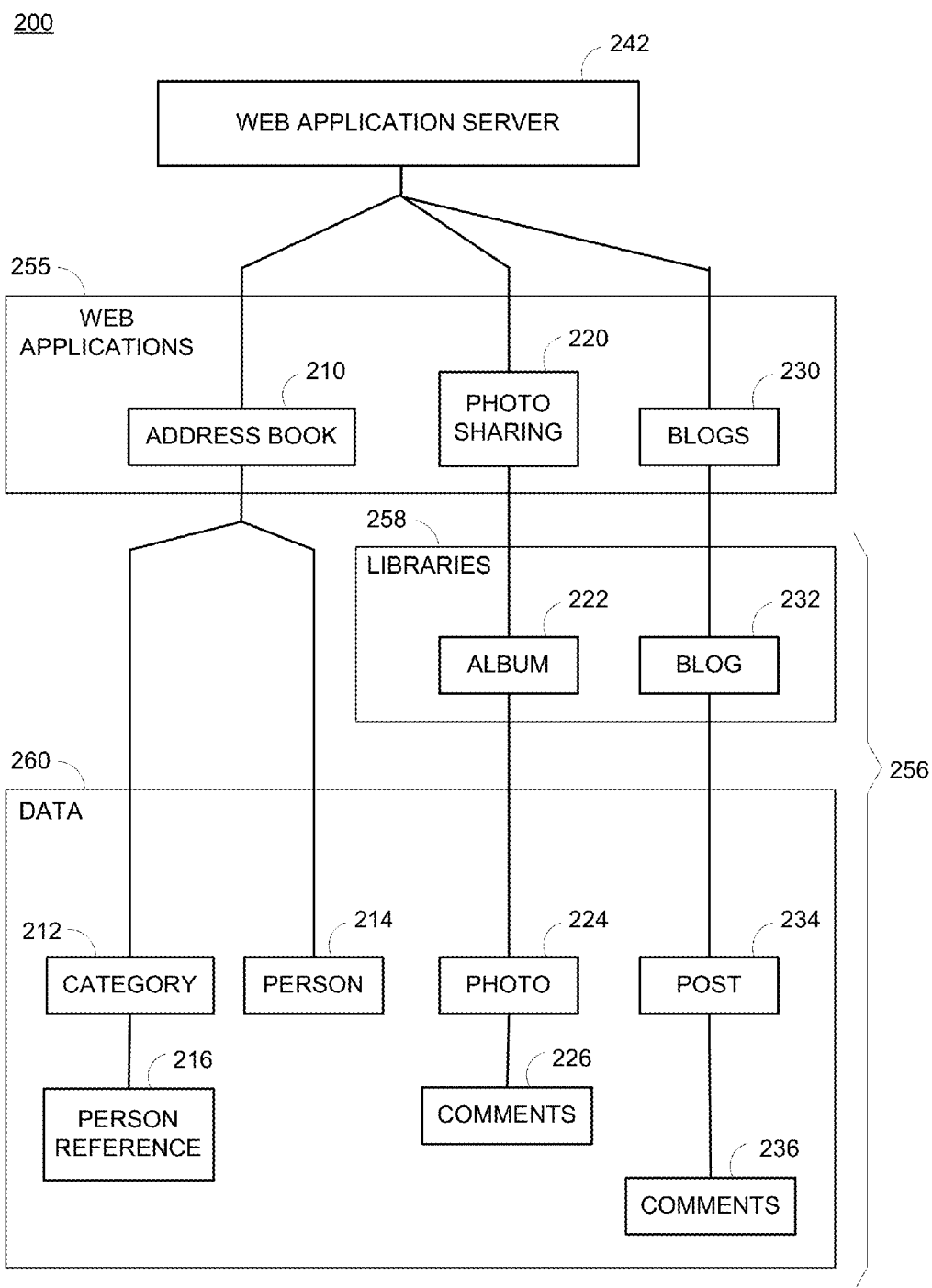
FIG. 2 illustrates a schematic diagram of an example application server resource hierarchy for which the various technologies described herein may be incorporated and practiced.

FIG. 2 illustrates a schematic diagram 200 of a resource hierarchy on a Web application server 242 for which the various technologies described herein may be incorporated and practiced. The resource hierarchy represents a namespace taxonomy by which the standardized client 114 identifies the Web application 155 and the resource 156 for a particular request. For example, the standardized client 114 may issue a request that specifies a centralized domain for the application programming interface (API) framework server 122 alongside the Web application 155 and the resource 156.

As shown, a Web application server 242 may have more than one Web application 255. Some examples of Web applications 255 include an address book 210, a photo sharing application 220, and a blogs application 230. Each application 255 has access to different types of resources 256. In one implementation, resources 256 can include data 260 and organizational-type resources, such as libraries 258. For example, the photo sharing application 220 may organize photos 224 (and associated comments 226) into albums 222. Similarly, the blogs application 230 may organize posts 234 and comments 236 into different blogs 232.

In another implementation, an application, such as the address book 210, may access data 260 without the use of libraries 258. For example, the address book 210 may access data 260, such as a person 214, by using other data 260 available to the address book 210, such as a category 212, and a person reference 216. In such a scenario, the person reference 216 may represent a pointer to each person 214 in a particular category 212.

In a system that publishes Web applications 155 to standardized clients 114, resource methods 154 may be stored on the application server 142 for each resource 256. Accordingly, in the example shown, resource methods 154 (one each for CREATE, READ, UPDATE, and DELETE) are stored for the album 222 and blog 232 libraries. The resource methods 154 are also stored for each of the category 212, person reference 216, person 214, photo 224, comments 226, post 234, and comments 236 data.

Figure 3:
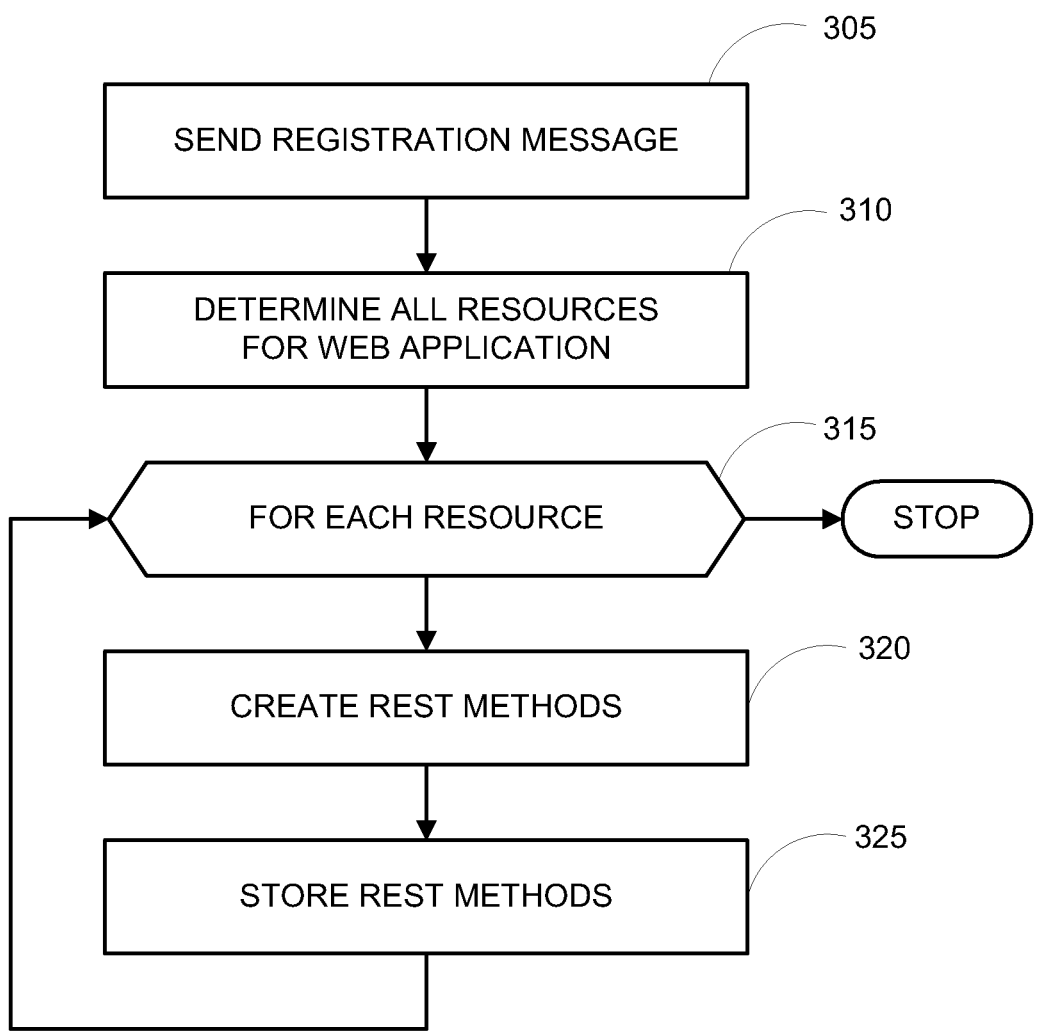
FIG. 3 illustrates a flow chart of a method for registering a network application with an application programming interface (API) framework in accordance with one or more implementations of various techniques described herein.

FIG. 3 illustrates a flow chart of a method 300 for registering a network application with an application programming interface (API) framework in accordance with one or more implementations of various techniques described herein. In one implementation, the method 300 may be performed by the registrar 153.

As shown, the method 300 begins at step 305 when the registrar 153 sends a registration message for each Web application 155 to the API framework 135. The registration message may include a namespace, the uniform resource identifier (URI) of the web application 155, and the formats for standardized clients 114 to which the Web application 155 is to be made accessible. Additionally, the registration message may specify the resources 156 associated with the registered Web application 155.

The namespace is an identifier by which the API framework 135 associates client requests for the Web application 155 with the Web application 155. The URI identifies the location of the web application 155. The formats may include any standardized format such as really simple syndication (RSS), ATOM Syndication, JavaScript Object Notation, extensible markup language (XML), or binary XML. The formats described herein are mere examples and are not intended to be limiting. Those skilled in the art appreciate that other formats, known or yet to be developed, may be used in various implementations described herein.

In one implementation, the registration message may include a security policy. The security policy may specify one or more rules for restricting client access to the Web application 155 and/or the associated resources 156. The security policy may be recorded in the API 138.

At step 310, the registrar 153 may determine all the resources 156 associated with the Web application 155 for which the registration message is sent. For example, all the resources 256 associated with the photo sharing application 220 include the album library 222, the photo data 224, and the comment data 226.

Steps 315-325 may be repeated for each resource 156 associated with the Web application 155. At step 320, the registrar 153 may create resource methods 154 for the resource 156. The resource methods 154 may include create, read, update, and delete (CRUD) methods for each resource 156. At step 325, the registrar 153 may store the resource methods 154 on the application server 142. As such, in response to client requests, the API framework 135 may create, read, update and delete resources 156 by invoking the stored resource methods 154.

Advantageously, developers of standardized clients 114 may consume numerous Web applications 155 registered in a centralized API framework 135. Without the centralized APIs 138 provided by the API framework 135, developers would have to develop clients to consume applications according to the varying models of APIs provided by the individual Web applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for registering a network application comprising a Web application with an application programming interface (API) framework, comprising:
   sending, from a registrar, to the API framework a registration message that associates a namespace comprising a universal resource identifier (URI) with the network application and that specifies an application resource associated with the network application, the application resource comprising at least one of a blog post, a discussion board post, or a photo, the registration message configured to enable the API framework to create an API associated with the network application in response to receiving the registration message, the registration message comprising:
      a format of a standardized client; and
      a security policy for at least one of the network application or the application resource, the security policy specifying a rule for restricting access, by the standardized client, to at least one of the network application or the application resource; and
   storing, by the registrar, create, read, update, and delete (CRUD) methods for the application resource associated with the network application, the CRUD methods configured to be invoked by a request comprising at least one of a representational state transfer (REST) request or a SOAP request from the API framework, the request from the API framework initiated in response to a hypertext transfer protocol request from the standardized client.

2. The method of claim 1, the format comprising Really Simple Syndication (RSS).

3. The method of claim 1, the format comprising ATOM Syndication.

4. The method of claim 1, the registrar comprised in an application server.

5. The method of claim 1, the API framework comprised in an API framework server.

6. The method of claim 1, the registrar comprised in an application server that is connected via a network to an API framework server comprising the API framework.

7. The method of claim 1, the application resource and the network application comprised in an application server.

8. The method of claim 7, the application server comprising the registrar.

9. The method of claim 1, comprising at least one of:
   determining the application resource associated with the network application; or
   creating the CRUD methods.

10. The method of claim 6, the standardized client connected to at least one of the application server or the API framework server via the network.

11. A computer-readable storage medium comprising instructions that when executed via a microprocessor perform a method comprising:
    sending, from a registrar, to an application programming interface (API) framework a registration message that associates a namespace comprising a universal resource identifier (URI) with a Web application and that specifies an application resource associated with the Web application, the application resource comprising at least one of a blog post, a discussion board post, or a photo, the registration message configured to enable the API framework to create an API associated with the Web application in response to receiving the registration message, the registration message comprising:
       a format of a standardized client; and
       a security policy for at least one of the Web application or the application resource, the security policy specifying a rule for restricting access, by the standardized client, to at least one of the Web application or the application resource; and
    storing, by the registrar, create, read, update, and delete (CRUD) methods for the application resource associated with the Web application, the CRUD methods configured to be invoked by a request comprising at least one of a representational state transfer (REST) request or a SOAP request from the API framework, the request from the API framework initiated in response to a hypertext transfer protocol request from the standardized client.

12. The computer-readable storage medium of claim 11, the registrar comprised in an application server.

13. The computer-readable storage medium of claim 11, the API framework comprised in an API framework server.

14. The computer-readable storage medium of claim 11, the registrar comprised in an application server that is connected via a network to an API framework server comprising the API framework.

15. The computer-readable storage medium of claim 14, the standardized client connected to at least one of the application server or the API framework server via the network.

16. The computer-readable storage medium of claim 11, the application resource and the Web application comprised in an application server.

17. The computer-readable storage medium of claim 16, the application server comprising the registrar.

18. A computer system, comprising:
    a first microprocessor; and
    a first memory comprising program instructions executable by the first microprocessor to:
       send, from a registrar, to an application programming interface (API) framework a registration message that associates a namespace comprising a universal resource identifier (URI) with a network application and that specifies an application resource associated with the network application, the application resource comprising at least one of a blog post, a discussion board post, or a photo, the registration message configured to enable the API framework to create an API associated with the network application in response to receiving the registration message, the registration message comprising:

a format of a client; and a security policy for at least one of the network application or the application resource, the security policy specifying a rule for restricting access, by the client, to at least one of the network application or the application resource; and store, by the registrar, one or more create, read, update, and delete (CRUD) methods for the application resource associated with the network application, the CRUD methods configured to be invoked by a request comprising at least one of a representational state transfer (REST) request or a SOAP request from the API framework, the request from the API framework initiated in response to a hypertext transfer protocol request from the client.

19. The computer system of claim 18, the registrar, the application resource and the network application comprised in an application server.

20. The computer system of claim 19, the application server connected via a network to an API framework server comprising the API framework.

* * * * *